United States Patent Office 3,533,288
Patented Oct. 13, 1970

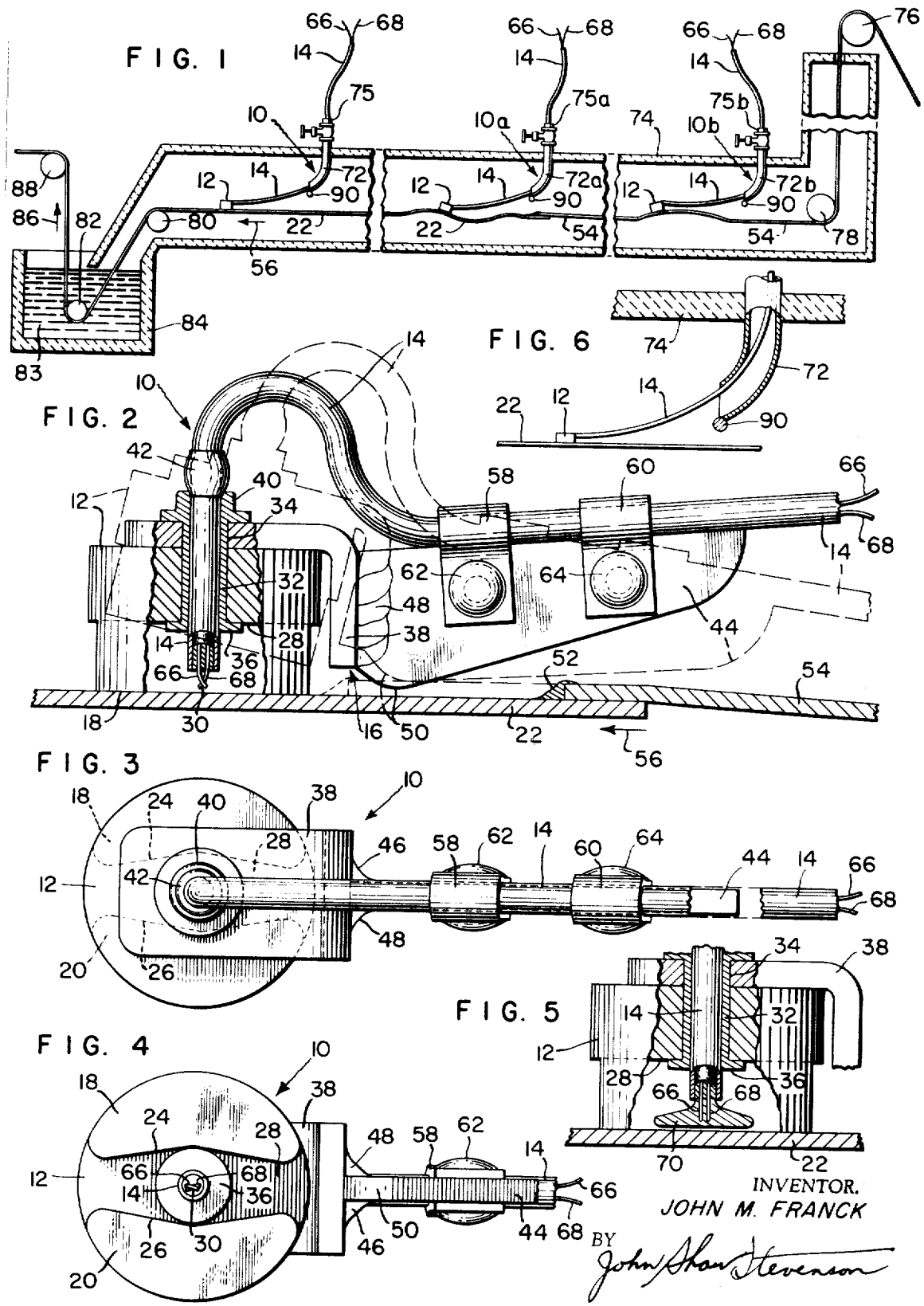

3,533,288
MAGNETIC DRAG THERMOCOUPLE
John M. Franck, Baltimore, Md., % Honeywell Inc., Industrial Products Group, 1100 Virginia Drive, Fort Washington, Pa. 19034
Filed Sept. 24, 1968, Ser. No. 761,922
Int. Cl. G01k 1/14, 7/04
U.S. Cl. 73—343
6 Claims

ABSTRACT OF THE DISCLOSURE

An apparatus to accurately sense the temperature of a continuously moving web of material such as the temperature along a continuously moving surface of two heated steel plates joined together at their ends to form a continuous strip wherein:

(1) A magnet is employed to retain a temperature sensing element in close proximity to the surface of one plate.

(2) A bowed shaped elongated extension is connected at one end to the temperature sensing element and in a snug relation with the magnet and another end is passed through a curved tube and is fixedly connected to one end thereof and (3) A cam plate fixedly connected to the right end and supported on the extension is employed to engage the moving joint formed between the steel plates to raise the magnet from one of the moving plate surfaces to the other to provide continuous temperature sensing of the strip without incurring damage to the magnet.

---

It is an object of the invention to provide an apparatus to sense the temperature of a moving web.

It is an object of the present invention to provide a temperature sensing apparatus having a permanent magnet, a shielded thermocouple wire extension of a substantially bowed shaped configuration connected at one of its ends in supporting relation with the magnet and a means to retain a hot junction forming one end of the extension within the magnet at preselected adjustably fixed distances from the surface of a magneticaly attractable moving web whose temperature is to be sensed.

It is also another object of the present invention to disclose a temperature sensing apparatus of the aforementioned type in which the magnetic fields of the magnet are constructed to always maintain the hot junction of the thermoscouple at the desired fixed distance to which it has been adjusted with respect to the magnetically attractable surface whose temperature is to be sensed even when this surface becomes buckled and inclining and declining wave type surfaces are formed therein.

It is another object of the present invention to disclose a temperature sensing apparatus of the aforementioned type whose hot junction is positioned in spaced apart relation between two opposing wall portions of the magnet so that changes in ambient temperatures will not adversely effect the temperature of the moving surface being sensed by the hot junction.

It is another object of the present invention to provide a cam shaped plate supported on the external surface of the aforementioned extension and positioned adjacent the magnet to provide a means of lifting the magnet from the top side of one magnetizable web to another web that is retained in overlapped relation therewith so that substantially continuous sensing of the surface temperature of each of these magnetizable webs can be effected as they are moved passed the magnet.

It is another object of the present invention to disclose a reliable temperature sensing apparatus of the aforementioned type for accurately sensing the temperature of a moving web in the form of a steel strip as it passes through any one or all of the several zones of a furnace to make sure that the temperature of the strip is within the narrow critical temperature range that is required in order to have a coating of tin, zinc or other galvanizing material properly adhere thereto when it is passed through a pot that contains such a galvanizing material in hot liquid form.

Heretofore radiation pyrometers have been used in an ateempt to continuously ascertain the temperature of steel strips as they move through a furnace to galvanizing not where they are coated. Radiation pyrometers are employed to optically measure the temperature of a surface by measuring the infrared energy emitted from that surface. Pyrometers of this type work best where the emissivity of the part under measurement is at the numerical value of one such as is substantially the case when the temperature of a black body, a molten ceramic or a molten metal is being measured. When however radiation pyrometers are cited upon a moving strip of steel that is being reheated in order to prepare it for galvanizing this kind of strip steel surface cannot be accurately measured by these pyrometers as the emissivity of this surface is not at the ideal numerical value of one which is required to make a good temperature measure possible. All attempts that have been made to compensate radiation pyrometers in such a way as to bring them to this ideal emissivity level of one have failed and no accurate commercialy available reproducible type of measurement of the temperature of a moving steel strip by such radiation pyrometers has been found to date.

It is therefore another object of the invention to disclose an apparatus for accurately sensing the temperature of a steel strip which is traveling at an average speed of approximately three hundred feet a minute and whose temperature sensing element cannot be adversely effected by the aforementioned emissivity factor nor adversely effected as is the case with radiation pyrometers by different forms of energy rays that are reflected and absorbed by portions of the furnace rather than the steel plate on which these radiation pyrometers are cited during different start up and running on stream temperture conditions.

It is another object of the present invention to disclose a hot junction positioned within a magnet that will sense the true temperature of successive portions of a moving steel plate that passes underneath the magnet in the same reproducible manner during furnace start up and while the furnace is operating on stream at its highest operating temperature condition.

A better understanding of the present invention may be had from the following detailed description when read in connection with the accompanying drawings in which:

FIG. 1 shows the temperature sensing device disclosed herein being used to sense the temperature of a web material such as a ferrous metal or steel strip prior to the time that it is moved into a galvanizing pot.

FIG. 2 shows how the temperature sensing apparatus is lifted from its solid line position to its dotted line position when its cam plate is engaged with a joint formed between two moving plates.

FIG. 3 shows a plan view of the temperature sensing apparatus shown in FIG. 2.

FIG. 4 shows a bottom view of the temperature sensing apparatus disclosed in FIG. 2 and FIG. 5 shows how a mass of thermally conductive material can be substituted for the hot junction of the temperature measuring apparatus of FIG. 2.

FIG. 6 shows in detail how the shielded thermocouple wire extensions shown in FIG. 2 are each purposely made of a elongated bowed shaped configuration in order to provide a flexible support that will return the magnet to its flat condition with a second strip whose temperature is to be sensed after the magnet has been raised to its dotted line position shown in FIG. 2.

The temperature sensing apparatus 10, 10a, 10b disclosed in FIG. 1 is of the same construction as the temperature sensing apparatus 10 shown in FIGS. 2-4. This temperature sensing apparatus has three major portions namely a permanent magnet 12, an extension 14 and a cam plate support unit 16.

The permanent magnet 12 is a suitable cast ALNICO material suitable for operating in atmospheres of eleven hundred degrees Fahrenheit and having a magnetomotive force per unit length of a minimum of four hundred oersteds.

The lower surfaces 18 and 20 of the magnet 12 are shown in flat surface to surface magnetic contact with the upper surface of the moving web, e.g. a steel plate 22 whose temperature is to be measured.

The wall portions 24, 26 and the wall portion 28 form an opening in the magnet 12 into which one end of the extension 14 and a temperature sensing element, in the form of a hot junction 30, is located.

A rivet 32 constructed of non magnetic stainless steel is shown passing through a cylindrical wall 34 forming an aperture in the magnet 12. The lower end of this rivet has a peened over portion 36 to retain the extension 14 passing therethrough in snug relation therewith. The upper end of the rivet 32 is shown passing through an angularly shaped support plate 38 surrounding same and has a peened upper end 40 to retain the magnet 12 in fixed relation for movement with the plate 38.

A slidable barrel shaped sleeve 42 is shown positioned in sliding engagement with the extension 14 to provide a wedge between the outer surface of the extension 14 and the inner wall of the hollow rivet 32 after the hot junction 30 and the lower end of the extension 14 adjacent thereto have been moved as a unit onto an up or down direction into a desired close proximity with the plate 22.

More specifically it can best be seen that the hot junction 30 can be adjusted to a desired position with respect to a web such as shown in the form of a steel plate 22 by first moving the barrel shaped non magnetic stainless steel sleeve 42 in an upward direction to allow the lower portion of the extension 14 to be pulled or pushed to a desired position. The hot junction 30 at the end of this extension can then be fixed in the desired position by then lowering the sleeve 42 into wedged engagement with the head portion 40 of the rivet 32.

The angularly shaped support plate is shown having an extendable cam shaped plate portion 44 cast as a unit with the plate 38 or welded by suitable material at 46 and 48 to the plate 38 as shown in FIGS. 3 and 4 to form the cam plate support unit 16 which is made of a non magnetic stainless steel.

The plate 44 is shown having a cam surface 50 along its lower edge. When a welded seam 52 joining the end of steel plate 22 to the front end of the plate 544 is brought into contact with this cam surface 50 as the sheets 22 and 54 are moved in the direction of the arrow 56, it will be moved from its solid line position to its dotted line position shown in FIG. 3.

The cam plate 44 is in turn connected by means of suitable non magnetic stainless steel U-shaped clips 58, 60 which surround the extension 14 and which are respectively connected by suitable nonmagnetic stainless steel rivet connections 62, 64 to the cam plate 44.

The modified temperature sensing apparatus as shown in FIG. 5 is identical to that as shown in FIGS. 2, 3, and 4 except that the extension wires 66, 68 do not terminate in a hot junction formed by two bimetal elements such as is shown at 30 but rather terminate in a mass of thermally conductive material 70.

Each of the upper ends of the extensions 14 is shown in FIGS. 1 and 6 passing through their associated curved tubes 72 and 72a, 72b which in turn are shown passing through wall 74 of a furnace and retained in the upper end of each pipe by an air tight fitting 75, 75a, 75b, while the strip 22, 54 is pulled by pinch rollers (not shown) over the rollers 76, 78, 80 to roller 82 where a tin, zinc or other galvanizing coating 83 in a pot 84 is applied to the sheet 22, 54. The sheet 22, 54 is then pulled by the pinch rollers out of the pot 84 in the direction indicated by the arrow 86, moves over the roller 88 and is thereafter formed into rolls of galvanizing material, not shown.

A bar 90 is shown welded to the lower edge of each of the pipes 72, 72a, 72b similar to that shown for pipe 72 in FIG. 6 in order to provide a surface over which the magnet 12 can ride without it being damaged by the edge of this pipe 72 when it is pulled in an upward direction during its removal throughout the upper wall 74 of the furnace 74 and after the air tight fitting 75 has been loosened.

The embodiments of the invention in which an exclusive property or privilege is claimed are defined as follows:

1. An apparatus to continuously sense the temperature of a moving web, comprising an extension, a means magnetically attractable toward a surface in contact with the web, said extension being connected to retain the magnetically attractable means in a substantially fixed juxtaposition to a portion along the moving web, a temperature sensing element connected to the extension and to the magetically attractable means at a position that is immediately adjacent the moving surface of the web to continuously sense its temperature and wherein the magnetically attractable means is a permanent magnet and a hollow nonmagnetic rivet is positioned within the magnet to provide a portion of an apertured wall therein to accommodate the passage of the temperature sensing element and extension therethrough.

2. An apparatus to continuously sense the temperature of a moving web, comprising an extension, a means magnetically attractable toward a surface in contact with the web, said extension being connected to retain the magnetically attractable means in a substantially fixed juxtaposition to a portion along the moving web, a temperature sensing element connected to the extension and to the magnetically attractable means at a position that is immediately adjacent the moving surface of the web to continuously sense its temperature and wherein the magnetically attractable means is a permanent magnet, a hollow nonmagnetic rivet is positioned within the magnet to provide a portion of an apertured wall therein to accommodate the passage of the temperature sensing element and extension therethrough and the head of the rivet retains one end of a support member fixedly connected to the magnet and another end of the support member extends away from the magnet and is supported on a curved portion of the extension.

3. An apparatus to continuously sense the temperature of a moving web, comprising an extension, a means magnetically attractable toward a surface in contact with the web, said extension being connected to retain the magnetically attractable means in a substantially fixed juxtaposition to a portion along the moving web, a temperature sensing element connected to the extension and to the magnetically attractable means at a position that is immediately adjacent the moving surface of the web to continuously sense its temperature and wherein the magnetically attractable means in a substantially fixed juxta- wherein the magnet is fixedly connected to a cam shaped plate for movement therewith in a reciprocal direction when the cam shaped plate is contacted by the end of a second moving web that is fixedly connected to the top of the first mentioned web under a condition in which substantially noninterrupted transfer of continuous temperatures sensing from the first web to the second web is desired.

4. An apparatus to continuously sense the temperature of a moving web, comprising an extension, a means magnetically attractable toward a surface in contact with the web, said extension being connected to retain the magnetically attractable means in a substantially fixed juxtaposition to a portion along the moving web, a temperature sensing element connected to the extension and to the magnetically attractable means at a position that is immediately adjacent the moving surface of the web to continuously sense its temperature and wherein the magnetically attractable means is a permanent magnet and wherein the magnet is fixedly connected to a cam shaped plate for movement therewith in a reciprocal direction when the cam shaped plate is contacted by the end of a second moving web that is fixedly connected to the top of the first mentioned web under a condition in which substantially noninterrupted transfer of continuous temperature sensing from the first web to the second web is desired and wherein the cam shaped plate is connected to the extension for flexible movement therewith.

5. An aparatus to continuously sense the temperature of a moving web, comprising an extension, a means magnetically attractable toward a surface in contact with the web, said extension being connected to retain the magnetically attractable means in a substantially fixed juxtaposition to a portion along the moving web, a temperature sensing element connected to the extension and to the magnetically attractable means at a position that is immediately adjacent the moving surface of the web to continuously sense its temperature and wherein the magnetically attractable means is a permanent magnet and wherein the magnet is fixedly connected to a cam shaped plate for movement therewith in a reciprocal direction when the cam shaped plate is contacted by the end of a second moving web that is fixedly connected to the top of the first mentioned web under a condition in which substantially noninterrupted transfer of continuous temperature sensing from the first web to the second web is desired and wherein said cam shaped plate is connected to the extension for flexible movement therewith and the cam shaped plate is shaped to cause the magnet to be moved clear of the end of the second web to thereby prevent the second web from hitting the magnet and loosening it from its position on said extension.

6. An apparatus to continuously sense the temperature of a moving web, comprising an extension, a means magnetically attractable toward a surface in contact with the web, said extension being connected to retain the magnetically attractable means in a substantially fixed juxtaposition to a portion along the moving web, a temperature sensing element connected to the extension and to the magnetically attractable means at a position that is immediately adjacent the moving surface of the web to continuously sense its temperature, and wherein the web is a metal strip and the extension protrudes way from the strip in a concave arc-shaped fashion through and is fixedly attached to a hollow curved support member forming a wall portion of a furnace to thereby provide a connection that will allow the surface of the magnet to be moved in a reciprocal direction while it is slidably retained on the strip and to thereby provide a means for continuously sensing the temperature when the moving surface on which the magnet is mounted becomes buckled.

References Cited

UNITED STATES PATENTS

| 2,279,846 | 4/1942 | Stapleton | 73—359 |
| 3,178,112 | 4/1965 | Rudd | 73—351 |

FOREIGN PATENTS

| 1,094,857 | 12/1954 | France. |

LOUIS R. PRINCE, Primary Examiner

D. E. CORR, Assistant Examiner

U.S. Cl. X.R.

73—359; 136—221, 230

UNITED STATES PATENT OFFICE
CERTIFICATE OF CORRECTION

Patent No. 3,533,288          Dated October 13, 1970

Inventor(s) John M. Franck

It is certified that error appears in the above-identified patent and that said Letters Patent are hereby corrected as shown below:

In the heading to the printed specification, lines 3 to 5, "John M. Franck, Baltimore, Md., % Honeywell Inc., Industrial Products Group, 1100 Virginia Drive, Fort Washington, Pa. 19034" should read -- John M. Franck, 1558 Winford Rd., Baltimore City, Md. --.

Signed and sealed this 26th day of January 1971.

(SEAL)
Attest:

EDWARD M. FLETCHER, JR.  
Attesting Officer

WILLIAM E. SCHUYLER, JR.  
Commissioner of Patents